US009615344B2

(12) United States Patent
Liu et al.

(10) Patent No.: US 9,615,344 B2
(45) Date of Patent: Apr. 4, 2017

(54) ENHANCED RANDOM ACCESS PROCEDURE FOR AIR-TO-GROUND COMMUNICATIONS

(71) Applicant: QUALCOMM Incorporated, San Diego, CA (US)

(72) Inventors: Ruoheng Liu, San Diego, CA (US); June Namgoong, San Diego, CA (US); Hai Le, San Diego, CA (US); Srikant Jayaraman, San Diego, CA (US); Sunil Kamavaram, San Diego, CA (US); Rajakumar Ebenezar Devairakkam, Chennai (IN); Venkatraman Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/265,123

(22) Filed: Apr. 29, 2014

(65) Prior Publication Data
US 2015/0181544 A1 Jun. 25, 2015

Related U.S. Application Data

(60) Provisional application No. 61/918,437, filed on Dec. 19, 2013.

(51) Int. Cl.
*H04W 56/00* (2009.01)
*H04W 74/08* (2009.01)
(Continued)

(52) U.S. Cl.
CPC ...... *H04W 56/004* (2013.01); *H04B 7/18506* (2013.01); *H04W 74/004* (2013.01); *H04W 74/0833* (2013.01); *H04W 74/002* (2013.01)

(58) Field of Classification Search
CPC .................................................. H04W 56/004
See application file for complete search history.

(56) References Cited

U.S. PATENT DOCUMENTS 8,036,205 B2   10/2011   Lane et al.
8,547,896 B2   10/2013   Park et al.
(Continued)

FOREIGN PATENT DOCUMENTS

EP           2077692 A2    7/2009
WO     WO-2006105316 A2   10/2006
(Continued)

OTHER PUBLICATIONS

Ericsson, et al., "Multiple Timing Advance, for Carrier Aggregation" 3GPP TSG-RAN WG2 #69, San Francisco, USA, Feb. 22-26, 2010, pp. 1-3, R2-101196, URL: http://www.3gpp.org/DynaReport/TDocExMtg--R2-69--28030.htm, 3rd Generation Partnership Project.

(Continued)

*Primary Examiner* — Jason Mattis
(74) *Attorney, Agent, or Firm* — Holland & Hart LLP

(57) ABSTRACT

Methods, systems, and devices are described for establishing a wireless communications link at an aircraft terminal (AT). An AT may determine a timing offset based on the propagation delay between the AT and a ground station, which in some cases may be more than 100 kilometers away. The AT may then transmit an initial access message to the ground station based on the determined timing offset. In some embodiments, the AT may receive an access response message from the ground station that includes a timing alignment value and adjust the timing offset based on this value. The AT may transmit a connection message to the ground (Continued)

station that includes AT location information. This information may be used by the ground station to facilitate beamforming.

31 Claims, 11 Drawing Sheets

(51) Int. Cl.
*H04B 7/185* (2006.01)
*H04W 74/00* (2009.01)

(56) References Cited

U.S. PATENT DOCUMENTS

| | | | | |
|---|---|---|---|---|
| 2006/0239238 | A1* | 10/2006 | Fernandez-Corbaton | H04B 7/01 370/342 |
| 2007/0161347 | A1* | 7/2007 | Ma | H04B 7/18506 455/11.1 |
| 2011/0085491 | A1 | 4/2011 | Tynderfeldt et al. | |
| 2011/0189943 | A1* | 8/2011 | Ilarregui | H04B 7/18508 455/7 |
| 2011/0286411 | A1 | 11/2011 | Kim et al. | |
| 2013/0039294 | A1* | 2/2013 | Wang | H04W 74/0833 370/329 |
| 2013/0201910 | A1 | 8/2013 | Bergstrom et al. | |
| 2013/0279433 | A1* | 10/2013 | Dinan | H04W 56/0005 370/329 |
| 2014/0362694 | A1 | 12/2014 | Rodrigues | |
| 2014/0362794 | A1* | 12/2014 | Zhao | H04W 56/0045 370/329 |

FOREIGN PATENT DOCUMENTS

| | | |
|---|---|---|
| WO | WO-2008104098 A1 | 9/2008 |
| WO | WO-2010148404 A1 | 12/2010 |
| WO | WO 2013063789 A1 | 5/2013 |

OTHER PUBLICATIONS

ISA/EPO, International Search Report and Written Opinion of the International Searching Authority, Int'l. App. No. PCT/US2014/069326, May 12, 2015, European Patent Office, Rijswijk, NL, 15 pgs.

IPEA/EPO, Notification of the International Preliminary Examining Authority, Int'l. App. No. PCT/US2014/069326, Apr. 7, 2016, European Patent Office, Munich, DE, 4 pgs.

Mouly et al., The GSM System for Mobile Communication, First Edition, 1992, The Radio Interface, p. 201, Bay Foreign Language Books.

IPEA/EPO, Second Written Opinion of the International Preliminary Examining Authority, Int'l. App. No. PCT/US2014/069326, Dec. 7, 2015, European Patent Office, Munich, DE, 7 pgs.

* cited by examiner

ENHANCED RANDOM ACCESS PROCEDURE FOR AIR-TO-GROUND COMMUNICATIONS

CROSS REFERENCES

The present Application for Patent claims priority to U.S. Provisional Patent Application No. 61/918,437 by Liu et al., entitled "ENHANCED RANDOM ACCESS PROCEDURE FOR AIR-TO-GROUND COMMUNICATIONS", filed Dec. 19, 2013, assigned to the assignee hereof, and expressly incorporated by reference herein.

BACKGROUND

The following relates generally to wireless communication, and more specifically to an access procedure for an air-to-ground wireless communication system. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of ground stations, each simultaneously supporting communication for multiple mobile devices. Ground stations may communicate with an aircraft terminal (AT) on downstream and upstream links. Each ground station has a coverage range, which may be referred to as the coverage area of the cell. In an air-to-ground system, the distance between the AT and a ground station may be larger than the distance between a mobile device and a base station in other wireless communications systems. This separation may result in a significant delay between a transmission and a reception of the transmission. Such a delay may result in a transmission being lost if it is not received during the time slot allocated for reception of the transmission.

A large distance between the AT and the ground station may also make it difficult to achieve a high signal-to-noise ratio (SNR). One way to improve the SNR is for a transmitter to use beamforming techniques to direct more energy towards the receiver. However, for a ground station to use beamforming techniques to transmit data to an AT, it may be necessary for the ground station to have additional information about the AT.

SUMMARY

The described features generally relate to one or more improved systems, methods, and/or apparatuses for establishing a wireless communications link at an aircraft terminal (AT). An AT may determine a timing offset based on the propagation delay between the AT and a ground station, which in some cases may be more than 100 kilometers away. The AT may then transmit an initial access message to the ground station based on the determined timing offset. In some embodiments, the AT may receive an access response message from the ground station that includes a timing alignment value. The AT may adjust the timing offset based on this value. The AT may transmit a connection message to the ground station that includes location information. This information may be used by the ground station to facilitate beamforming.

A method is described of establishing a wireless communications link at an aircraft terminal (AT), comprising determining a timing offset based at least in part on a propagation delay between the AT and a ground station, transmitting an initial access message to the ground station based at least in part on the determined timing offset, receiving an access response message from the ground station that includes a timing alignment value and adjusting the timing offset based at least in part on the timing alignment value. In some cases, the distance between the AT and the ground station is at least 100 kilometers In one embodiment, determining the timing offset further comprises identifying an AT location and comparing the AT location to a ground station location. The AT may identify the AT location from a Global Positioning System (GPS) device and access the ground station location from a stored set of ground station locations.

In one embodiment, the access response message may comprise at least a radio network temporary identifier (RNTI) and an uplink grant resource; wherein the uplink grant resource should reserve resources sufficient for an uplink transmission of a connection message with an AT location information; and the RNTI may be either a cell-RNTI (C-RNTI) or a temporary cell RNTI (TEMP-CRNTI).

The method may further comprise transmitting a connection message that includes location information. The location information may comprise at least a longitude value, a latitude value, and an altitude value indicating a location of the AT. Transmitting the connection message may be based at least in part on the adjusted timing offset.

The method may further comprise transmitting the initial access message to be received at the ground station by a subset of ground station antenna elements comprising one or more widely-spaced elements configured to achieve wide coverage and antenna diversity.

An apparatus is described for establishing a wireless communications link at an AT, comprising means for determining a timing offset based at least in part on a propagation delay between the AT and a ground station, means for transmitting an initial access message to the ground station based at least in part on the determined timing offset, means for receiving an access response message from the ground station that includes a timing alignment value and means for adjusting the timing offset based at least in part on the timing alignment value.

An apparatus is described for establishing a wireless communications link at an AT, comprising a processor, memory in electronic communication with the processor, and instructions stored in the memory, the instructions being executable by the processor to transmit an initial access message to a ground station, receive an access response message, and transmit an RRC connection request message to the ground station, the RRC connection request message comprising location information of the AT.

A computer program product is described for establishing a wireless communications link at an AT, the computer program product comprising a non-transitory computer-readable medium storing instructions executable by a processor to transmit an initial access message to a ground station, receive an access response message, and transmit an RRC connection request message to the ground station, the RRC connection request message comprising location information of the AT.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 is a flowchart of a method for establishing a wireless communications link at an AT;

DETAILED DESCRIPTION

A method, system, and apparatus for establishing a wireless communications link at an aircraft terminal (AT) are described. An AT may determine a timing offset based on the propagation delay between the AT and a ground station, which in some cases may be more than 100 kilometers away. The AT may then transmit an initial access message to the ground station based on the determined timing offset. The initial access message may be a random access preamble. In some embodiments, the AT may receive an access response message from the ground station. The access response message may include a timing alignment value. In one configuration, the AT may adjust the timing offset based on the timing alignment value. The AT may transmit a connection message to the ground station. In one example, the connection message may include location information for the AT. The location information may be used by the ground station to facilitate beamforming.

Transmitting an initial access message based on a timing offset may result in the ground station being able to receive the transmission within a period allotted for receiving the initial access message. This may result in a more reliable access procedure. Furthermore, transmitting location information together with a connection request may allow the ground station to use beamforming to direct in the direction of the AT for subsequent downlink and uplink communications. This may enable a higher signal-to-noise ratio radio link, more reliable transmission, and higher data rates.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
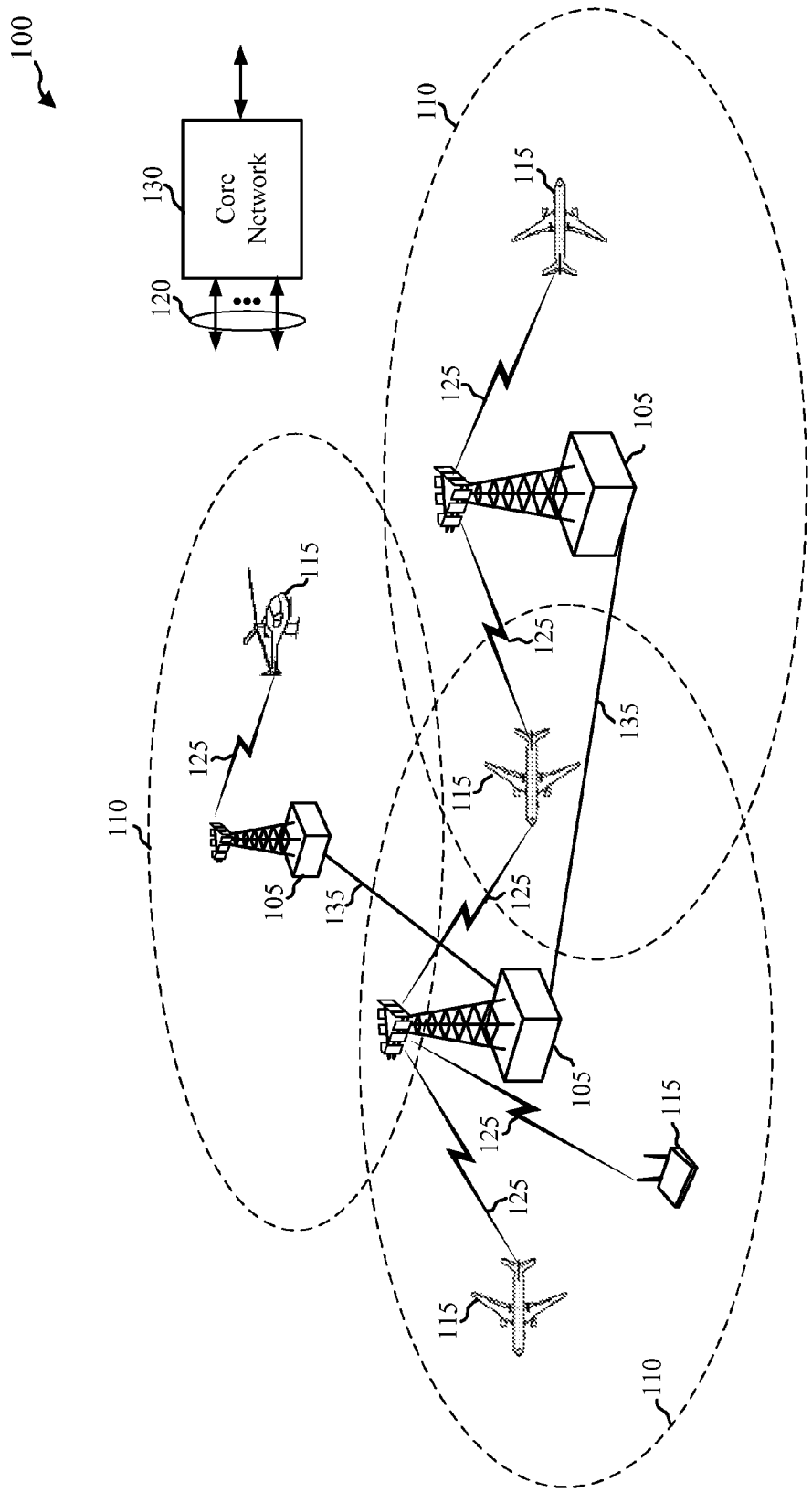
FIG. 1 shows a system diagram of an air-to-ground wireless communications system.

Referring first to FIG. 1, a diagram illustrates an example of an air-to-ground wireless communication system 100. The air-to-ground wireless communication system 100 includes a number of ground stations (or cells) 105, ATs 115, and a core network 130. The ground stations 105 may communicate with the ATs 115 under the control of a ground station controller (not shown), which may be part of the core network 130 or the ground stations 105 in various embodiments. Ground stations 105 may communicate control information and/or user data with the core network 130 through backhaul links 120. In some embodiments, the ground stations 105 may communicate, either directly or indirectly, with each other over backhaul links 135, which may be wired or wireless communication links. The air-to-ground wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The ground stations 105 may wirelessly communicate with an AT 115 via one or more ground station antennas. Each of the ground station 105 sites may provide communication coverage for a respective geographic coverage area 110. The geographic coverage area 110 may be large compared to the cell size of a ground-to-ground wireless system. In some cases the geographic area may have a radius of hundreds of kilometers. Due to the large geographic coverage area, the distance between an AT and a serving ground station may be larger than 100 kilometers. The distance may be larger than the distance between a traditional mobile device and base station. In some cases a subset of ground station antenna elements including one or more widely spaced elements may be configured to achieve wide coverage and antenna diversity.

In some embodiments, a ground station 105 may be referred to as a base station, a base transceiver station, a radio ground station, an access point, a radio transceiver, a basic service set (BSS), an extended service set (ESS), a NodeB, eNodeB (eNB), or some other suitable terminology. The geographic coverage area 110 for a ground station 105 may be divided into sectors making up only a portion of the coverage area (not shown). There may be overlapping coverage areas for different technologies.

The core network 130 may communicate with the ground stations 105 via a backhaul links 120 (e.g., S1, etc.). The ground stations 105 may also communicate with one another, e.g., directly or indirectly via backhaul links 135 (e.g., X2, etc.) and/or via backhaul links 120 (e.g., through core network 130). The air-to-ground wireless communication system 100 may support synchronous or asynchronous operation. For synchronous operation, the ground stations 105 may have similar frame timing, and transmissions from different ground stations 105 may be approximately aligned in time. For asynchronous operation, the ground stations 105 may have different frame timing, and transmissions from different ground stations 105 may not be aligned in time. The techniques described herein may be used for either synchronous or asynchronous operations.

The ATs 115 are dispersed throughout the air-to-ground wireless communication system 100. An AT may be located on an airborne vehicle such as an airplane, helicopter, or balloon. In some cases the AT 115 may also be located on the ground. An AT 115 may also be referred to as a mobile device, a user equipment, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a user agent, a mobile client, a client, or some other suitable terminology. An AT 115 may be a two-way radio, a radio cellular phone, a wireless modem, a wireless communication device, a handheld device, a wireless local loop (WLL) station, or the like.

The communication links 125 shown in the air-to-ground wireless communication system 100 may include uplink (UL) transmissions from an AT 115 to a ground station 105, and/or downlink (DL) transmissions, from a ground station 105 to an AT 115. The downlink transmissions may also be called forward link transmissions, while the uplink transmissions may also be called reverse link transmissions. Due to the potentially large distance between an AT 115 and a ground station 105, the communication links 125 may involve a significant propagation delay. A ground station 105 or AT 115 may utilize beamforming techniques to improve the signal-to-noise ratio for a communication link 125.

Figure 2:
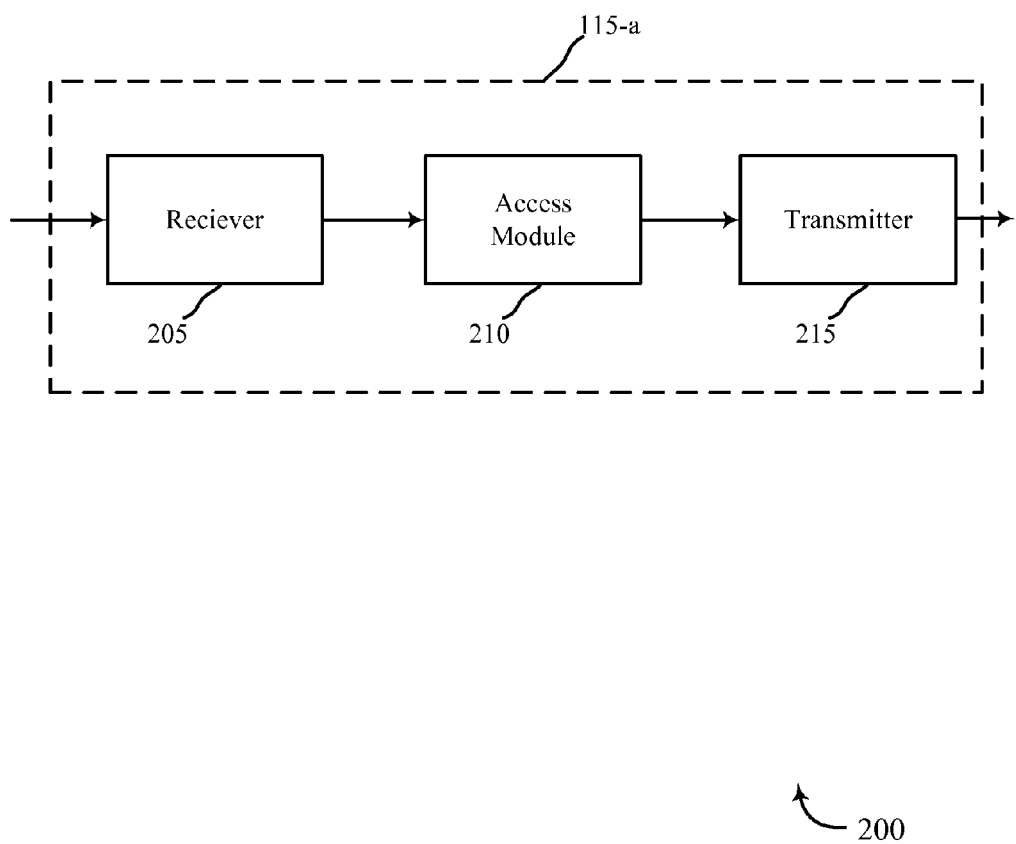
FIG. 2 shows a block diagram of an exemplary aircraft terminal (AT)

Turning next to FIG. 2, a block diagram 200 illustrates an exemplary AT 115-*a* for establishing a wireless communications link with a ground station 105 in accordance with various embodiments. The AT 115-*a* may be an example of one or more aspects of an AT 115 described with reference to FIG. 1. The AT 115-*a* may include a receiver 205, an access module 210, and/or a transmitter 215. The AT 115-*a* may also include a processor (not shown). Each of these components may be in communication with each other.

These components of the AT 115-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the AT 115-*a*.

The receiver 205 may receive information such as packets, user data, and/or control information including synchronization signals and access messages. The received information may be demodulated, descrambled, de-interleaved, and decoded. The information may be passed on to the access module 210, and to other components of the AT 115-*a*. The receiver 205 may include a single antenna, or it may include a plurality of antennas.

The access module 210 may perform steps to establish a communication link 125 with a ground station 105 including determining a timing offset. This timing offset may enable the ground station 105 to receive access messages within a time period allotted to receiving such messages. Information and instructions may be passed to a processor (not shown), the receiver 205, the transmitter 215, or other components of the AT 115-*a*.

The transmitter 215 may transmit the one or more signals received from the access module 210 or other components of the AT 115-*a*. For example, the transmitter 215 may transmit an initial access message to a ground station 105 based at least in part on the determined timing offset. In some embodiments, the transmitter 215 may be collocated with the receiver 205 in a transceiver module (not shown). The transmitter 215 may include a single antenna, or it may include a plurality of antennas.

Figure 3:
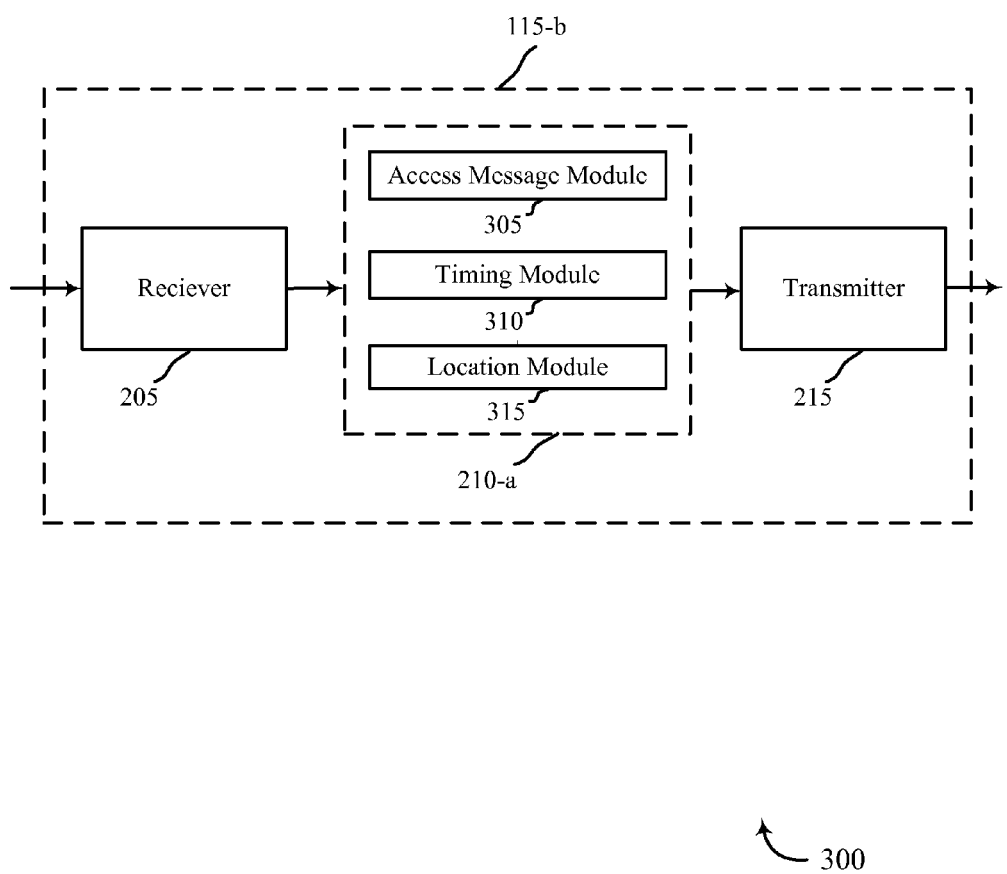
FIG. 3 shows a block diagram of an exemplary AT depicting the Access Module in more detail.

Turning next to FIG. 3, a block diagram 300 illustrates an exemplary AT 115-*b* for establishing a wireless communications link with a ground station 105 in accordance with various embodiments. The AT 115-*b* may be an example of one or more aspects of an AT 115 described with reference to FIGS. 1 and/or 2. The AT 115-*b* may include a receiver 205, an access module 210-*a*, and/or a transmitter 215. The access module 210-*a* may be an example of the access module 210 described with reference to FIG. 2. In one configuration, the access module 210-*a* may include an access message module 305, a timing module 310, and a location module 315.

These components of the AT 115-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the AT 115-*b*.

The receiver 205 may perform the functions described above. In particular, it may receive an access response message from a ground station, which may include a timing alignment value. It may also receive a contention resolution message. In some cases, the receiver 205 may also receive data on a downlink from the ground station, the data being transmitted on the downlink via a beamforming configuration at the ground station.

The transmitter 215 may perform the functions described above. Additionally, the transmitter 215 may transmit a connection message that includes location information. In particular, the transmitter 215 may transmit a Radio Resource Control (RRC) connection request message to the ground station 105, the RRC connection request message comprising location information of the AT. The transmitting of the connection message may be based at least in part on an adjusted timing offset. In some cases, the transmitter 215 may transmit an initial access message to be received at the ground station by a subset of ground station antenna elements comprising one or more widely spaced elements configured to achieve wide coverage and antenna diversity. In one embodiment, the transmitter 215 may transmit data on an uplink to the ground station 105, the data being received on the uplink via a beamforming configuration at the ground station 105.

The initial access message module 305 may send and receive messages relating to an access procedure in order to establish a communication link 125 with a ground station 105. These messages include, but are not limited to an initial access message, an access response message, a connection message, and a contention resolution message. The initial access message and the connection message may be sent with the transmitter 215. The access response message and the contention resolution message may be received in coordination with the receiver 205.

The timing module 310 may determine a timing offset based at least in part on a round trip propagation delay between the AT 115 and a ground station 105. Since the propagation delay may depend in part on the location of the AT, the timing module 310 may determine the timing offset in coordination with the location module 315. The location module may identify the AT location and compare the AT location to a ground station location.

Figure 4:
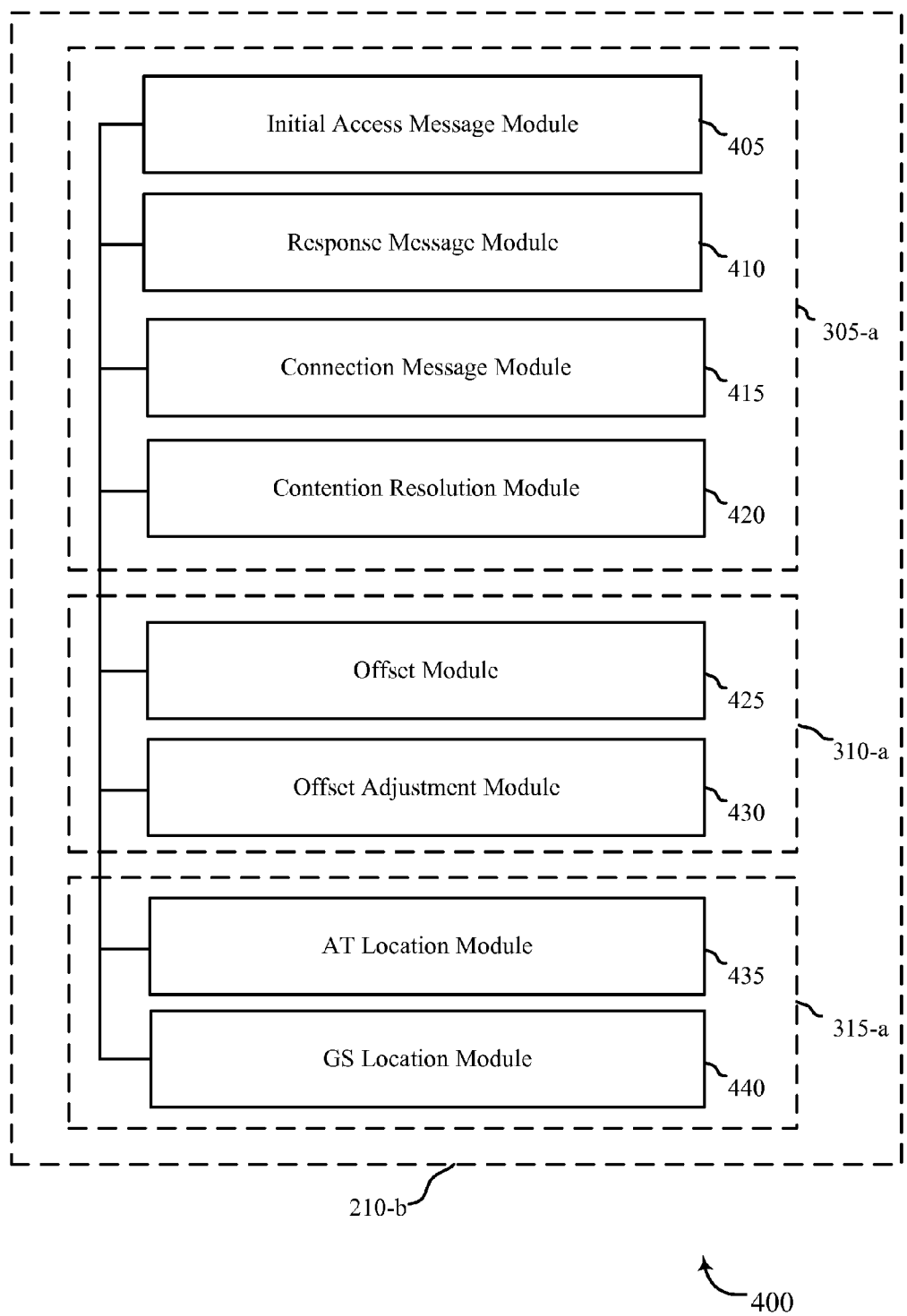
FIG. 4 shows a block diagram of an example of an Access Module.

Turning next to FIG. 4, a block diagram 400 illustrates an exemplary access module 210-*b* for establishing a wireless communications link with a ground station 105 in accordance with various embodiments. The access module 210-*b* may be an example of one or more aspects of an access module 210 described with reference to FIGS. 2 and/or 3. The access module 210-*b* may include an access message module 305-*a*, a timing module 310-*a*, and a location module 315-*a*, which may perform the functions described above with reference to FIG. 3. The access message module 305-*a* may include an initial access message module 405, a response message module 410, a connection message module 415, and a contention resolution module 420. The timing module 310-*a* may include an offset module 425 and an offset adjustment module 430. The location module 315-*a* may include an AT location module 435 and a ground station (GS) location module 440.

These components of the access module 210-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the access module 210-*b*.

The initial access message module 405 may, in coordination with the transmitter 215, transmit an initial access message to the ground station 105 based at least in part on a determined timing offset in coordination with the offset module 425. The initial access message transmission may convey a Random Access Radio Network Temporary Identifier (RA-RNTI). The RA-RNTI may be determined by the PRACH transmission time and frequency, and in some cases does not depend on the initial access message. As an example, the initial access message may comprise 6 bits of information. In this case, the initial access module may select at random one of 64 available Random Access Channel (RACH) preambles. There is a chance that this selection may result in the selection of a RACH preamble that is the same as the preamble selected by another AT during the same period, resulting in colliding requests.

The response message module 410 may, in coordination with the receiver 205, receive an access response message from the ground station which may include a timing alignment value. The response message module 410 may pass this timing alignment value on to the offset adjustment module 430. The access response message may comprise at least a radio network temporary identifier (RNTI) and an uplink grant resource, wherein the uplink grant resource should reserve resources sufficient for an uplink transmission of a connection message with AT location information described below; and the RNTI may be, for example, a cell-RNTI (C-RNTI) or a temporary cell RNTI (TEMP-CRNTI). The response message module 410 may process this information to coordinate future communications with the ground station 105 over a communication link 125. In some cases this includes determining which uplink shared channel (UL-SCH) resources the AT 115 may use.

The connection message module 415 may, in coordination with the transmitter 215, transmit a connection message to a ground station 105. The connection message may be transmitted based at least in part on an adjusted timing offset in coordination with the offset adjustment module 430. The connection message may include location information from the AT location module 435. In some cases the connection message may be an RRC connection request message, and may include one or more of an RRC connection request, an RRC re-establishment request, a random value, a Temporary Mobile Subscriber Identity (TMSI), or a connection establishment cause. The connection message may be based at least in part on whether the AT is establishing a new communication link 125 with a ground station 105, or re-establishing a previously existing connection.

The contention resolution module 420 may, in coordination with the receiver 205, receive a contention resolution message. A contention resolution message may be addressed to an AT 115 with a specific TMSI or random number. It may include a C-RNTI to be used for further communications. In the case when a plurality of ATs 115 select the same RACH preamble for the initial access message, one or more ATs 115 may not receive a contention resolution message. In this case, after waiting for a period of time determined by the contention resolution module 420, an AT 115 that did not receive a contention resolution message may send another initial access message.

The offset module 425 may determine a timing offset which may be based at least in part on a propagation delay between the AT 115 and the ground station 105. The propagation delay may be based on the distance between the AT and the ground station. In one example, the distance may be larger than 100 kilometers. Due to the large distance, the propagation delay may be sufficiently long that without an offset the initial access message may be received at the ground station 105 outside a detection window for initial access messages. The timing offset may be determined prior to receiving any messages from the ground station. The timing offset may be determined in coordination with the AT location module 435 and the GS location module 440.

Transmitting according to the timing offset may result in the initial access message being received within the detection window, but it may not be synchronized at the beginning of the detection window. An initial access message may include a cyclic prefix and/or a guard time so that the message may be correctly received in cases when the transmission is not synchronized with the detection window.

The offset adjustment module 430 may adjust the timing offset based at least in part on a timing alignment value received as part of an access response message from a ground station 105. The adjusted timing offset may result in communications that are synchronized or approximately synchronized between an AT 115 and a ground station 105. The timing offset may need to be adjusted one or more times based on changes in the location of the AT 115. These adjustments may be made based on one or more timing alignment messages received from a ground station 105. In some embodiments, adjustments may be made independent of timing alignment messages.

The AT location module 435 may identify an AT location. The AT location may be identified from a Global Positioning System (GPS) device. The AT location may also be determined in coordination with other aircraft navigation equipment. In some embodiments, the AT location module 435 may contain components that may determine the location of the AT 115 independent of information received from other aircraft navigation units, including aircraft GPs devices. The AT location information may comprise one or more or as latitude, longitude, altitude, heading velocity or a time stamp. It may be configured to facilitate beamforming between an AT 115 and a ground station 105 on the uplink or downlink. The AT location may coordinate with the GS location module 440 and pass information to the offset module 425.

The GS location module 440 may identify a ground station location. The location module 315-a may compare the AT location to the ground station location and pass information to the offset module 425. The ground station module may be determined prior to receiving any communication from the ground station, or it may be received from the ground station 105. In the case that the ground station location is determined prior to receiving location information from the ground station 105, the GS location module 440 may access the ground station location from a stored set of ground station locations. A stored set of ground station locations may be stored in a memory located on the AT 115. A ground station location may also be entered by an AT operator. The ground station location may be selected based on information about the coverage area 110 of a ground station 105, in comparison to an AT location received from the AT location module 435.

Figure 5:
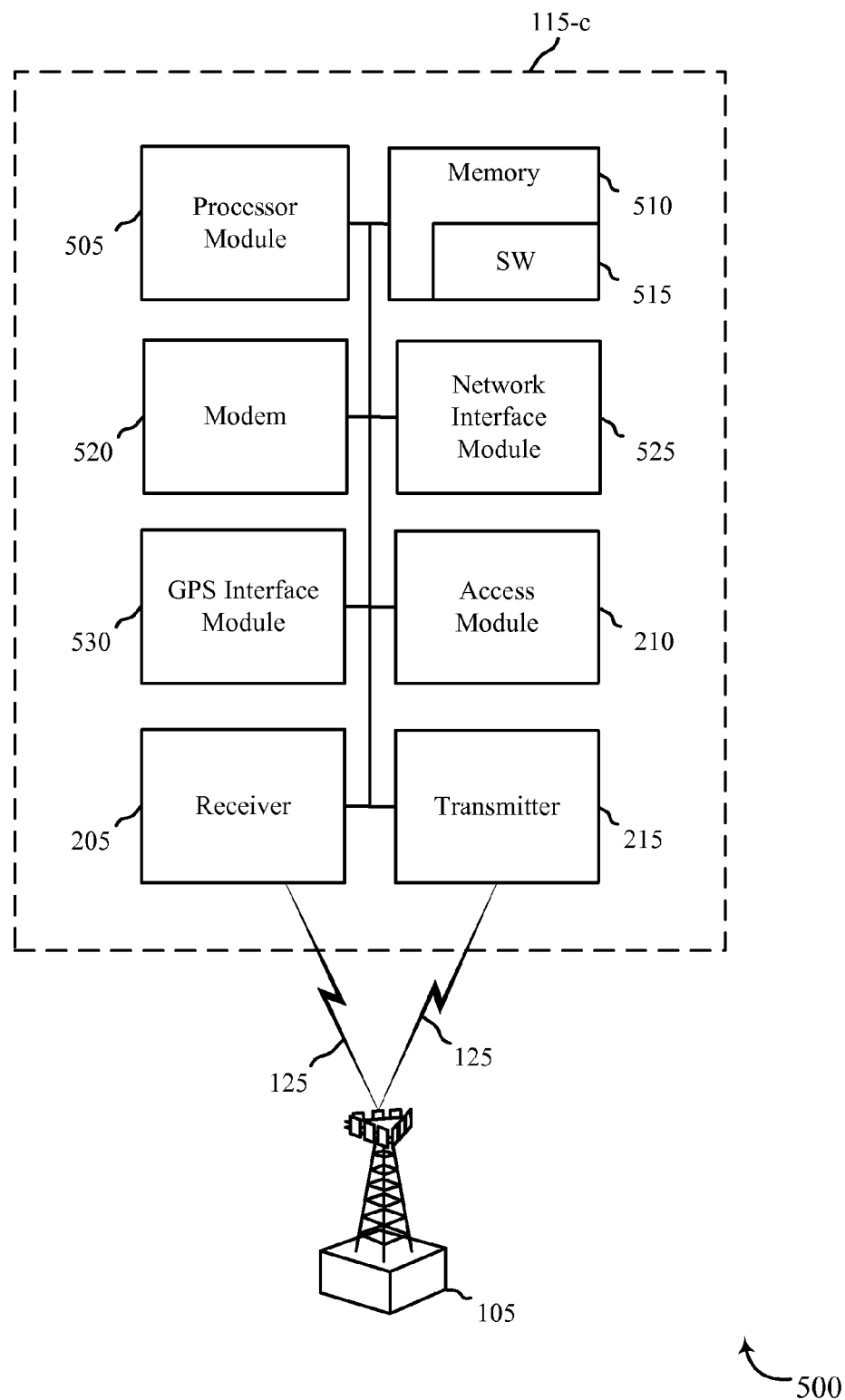
FIG. 5 shows a block diagram of an AT in communication with a ground station.

Turning next to FIG. 5, a block diagram 500 illustrates an exemplary AT 115-c in communication with a ground station 105. The AT 115-c and its components may be an example of one or more aspects of a AT 115 described with reference to FIGS. 1, 2, and/or 3. The components of AT 115-c may also have similar functionality to the components of discussed above. For example, the access module 210 may be an example of the access module 210 with reference to FIGS. 2, 3, and/or 4. The receiver 205 and the transmitter 215 may perform the functions previously described with reference to FIG. 2-3.

In addition to the receiver 205, the access module 210, and/or the transmitter 215, the AT 115-c may also include a processor module 505, a memory 510, software 515, a modem 520, a network interface module 525, and a GPS interface module 530, which each may be in communication, directly or indirectly, with each other (e.g., over one or more buses). The receiver 205 and transmitter 215 may be configured to communicate bi-directionally with a core network 130 through one or more ground stations 105.

The AT 115-c may also include a non-transitory computer-readable medium storing instructions executable by a processor that may be included in the processor module 505. The memory 510 in particular may also be in electronic communication with the processor module 505. The memory 510 may include random access memory (RAM) and read-only memory (ROM).

The memory 510 may also store computer-readable, computer-executable software code 515 containing instructions that are configured to, when executed, cause the processor module 505 to perform various functions described herein (e.g., call processing, database management, message routing, etc.). Alternatively, the software code 515 may not be directly executable by the processor module 505 but may be configured to cause the computer, e.g., when compiled and executed, to perform functions described herein. The processor module 505 may include an intelligent hardware device, e.g., a central processing unit (CPU), a microcontroller, an application-specific integrated circuit (ASIC), etc.

The AT 115-c may communicate with the ground station 105 using the modem 520 according to an interface managed by the network interface module 525. The modem, in coordination with receiver 205 may demodulate, descramble, de-interleave, and/or decode information received from the ground station 105. The modem may also encode, interleave, scramble and modulate data to be transmitted in coordination with the network interface module 525 and transmitter 215. The modulation/demodulation scheme may be determined based on the technology of the air-to-ground wireless communication system 100, and it may also be based on the quality of the communication link 125.

The GPS interface module 530 may receive location information from an aircraft GPS unit. It may also coordinate with other aircraft navigation units and send location information to the AT location module 435. The GPS interface module 530 may coordinate with the AT location module 435 to determine the reliability of location information. A reliability determination may depend on the availability of information from different AT navigation units.

Figure 6:
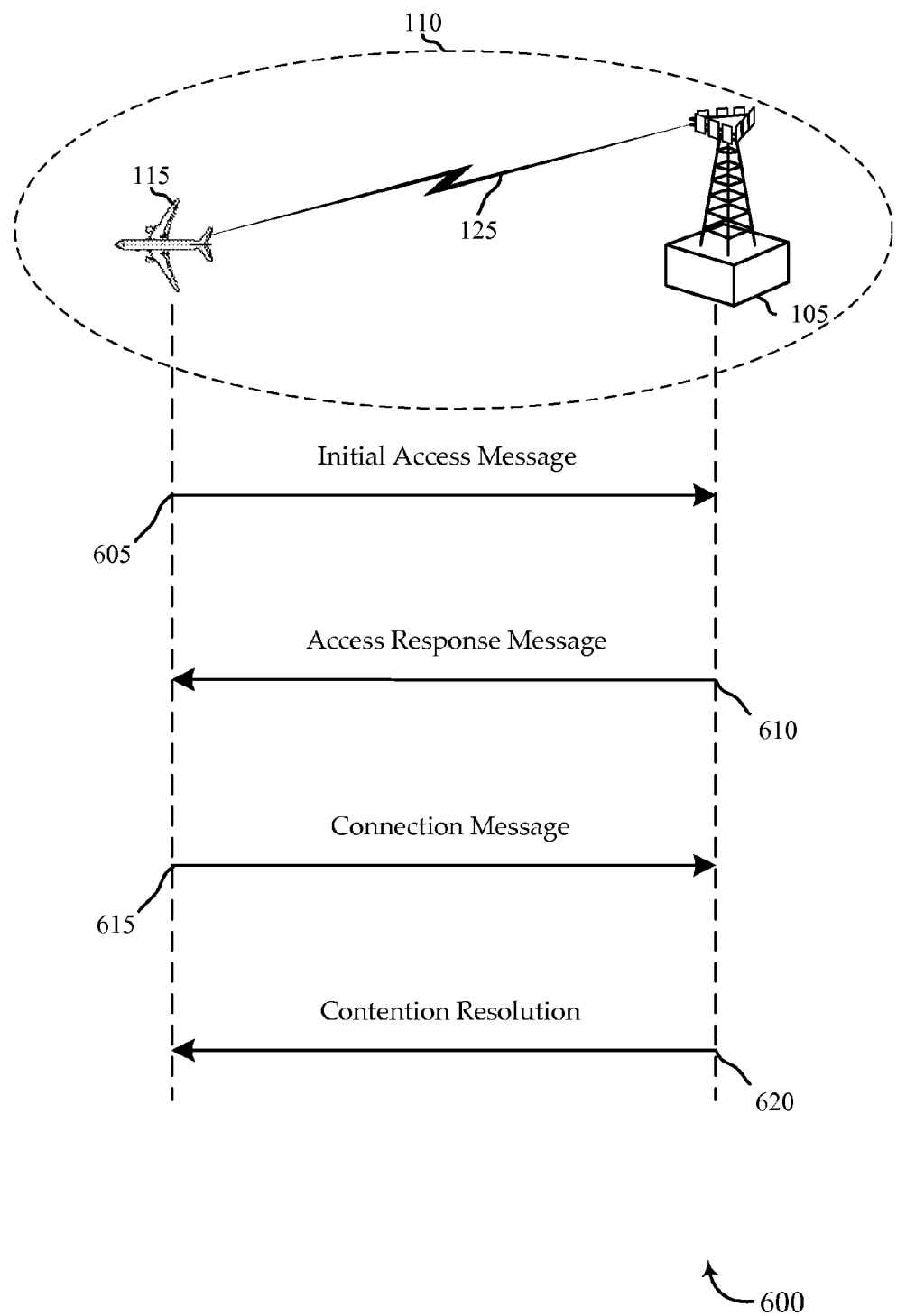
FIG. 6 shows a diagram of an access procedure.

Turning next to FIG. 6, a diagram 600 illustrates an access procedure that may be used to establish a communication link 125 with a ground station 105. The ground station 105, geographic coverage area 110, AT 115, and communication link 125 may be examples of the components of the air-to-ground wireless communication system 100 with reference to FIGS. 1, 2, 3, 4, and/or 5. The procedure may be initiated when the AT 115 enters the geographic coverage area 110 of the ground station 105.

The initial access message 605 may be generated by the initial access module 405 and transmitted by transmitter 215 to a ground station 105. It may comprise a random number selected by the AT 115 to distinguish it from other ATs 115 that may be attempting to initiate communications with the ground station 105. In some cases, the initial access may be the first indication that a ground station 105 receives indicating that an AT 115 is about to request a communication link 125. In other cases, the ground station 105 may have received an indication from the core network 130 that the AT 115 is entering its coverage area 110. The initial access message may be transmitted according to a timing offset determined by offset module 425.

The access response message 610 may be transmitted by a ground station 105 and received by AT 115 through the coordination of a receiver 205 and a response message module 410. The access response message 610 may be sent by the ground station 105 after receiving an initial access message 605. The access response message 610 may include a timing alignment value.

The connection message 615 may be generated by the connection message module 415 and transmitted by transmitter 215 to a ground station 105. It may include a request to establish an RRC interface with the ground station 105. The connection message 615 may be transmitted according to an adjusted timing offset based on the timing alignment value received in the access response message 610.

The contention resolution message 620 may be transmitted by a ground station 105 and received by AT 115 through the coordination of a receiver 205 and a contention resolution module 420. It may be used to resolve collisions caused by selection of a non-unique initial access message 605. In some cases, reception of a contention resolution message 620 addressed to an AT 115 may be an indication to proceed with communications over link 125.

Figure 7:
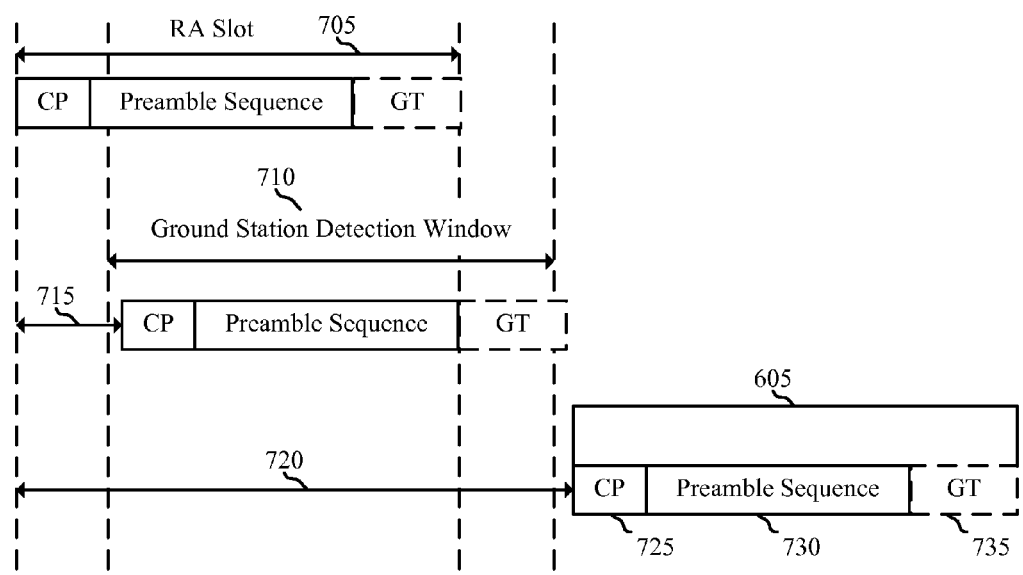
FIG. 7 shows a diagram of the relation between a received preamble sequence and a ground station detection window.

Turning next to FIG. 7, a diagram 700 illustrates the relation between a received initial access message and a ground station detection window 710. A transmission from an AT 115, such as the initial access message 605 with reference to FIG. 6, may be associated with a random access (RA) transmission slot 705. Due to propagation delay between an AT 115 and a ground station 105, the ground station detection window 710 for the initial access message may begin after a delay.

In some embodiments, the initial access message 605 may comprise a cyclic prefix (CP) 725, a preamble sequence 730, and a guard time (GT) 735. In a ground-to-ground communications system the geographic coverage area of a cell may be small enough so that any mobile device within the coverage area will transmit with a short propagation delay 715 so that the preamble sequence 730 falls within the detection window 710. Due to the potentially large cell size in an air-to-ground wireless communication system 100, however, some ATs 115 may experience a long propagation delay 720 so that the preamble sequence 730 falls outside the detection window 710. This may result in an unsuccessful reception of the message.

An initial access message 605 transmitted with a timing offset may approximate a transmission with a short propagation delay 715, so that the preamble sequence 730 falls within the ground station detection window 710 regardless of the location of the AT 115. An adjusted timing offset may be even more precise than the initial timing offset, and may result in even more reliable reception of transmissions. In some cases, the ground station 105 may be able to successfully receive an initial access message if the CP 725 or the GT 735 fall outside of the detection window.

Figure 8:
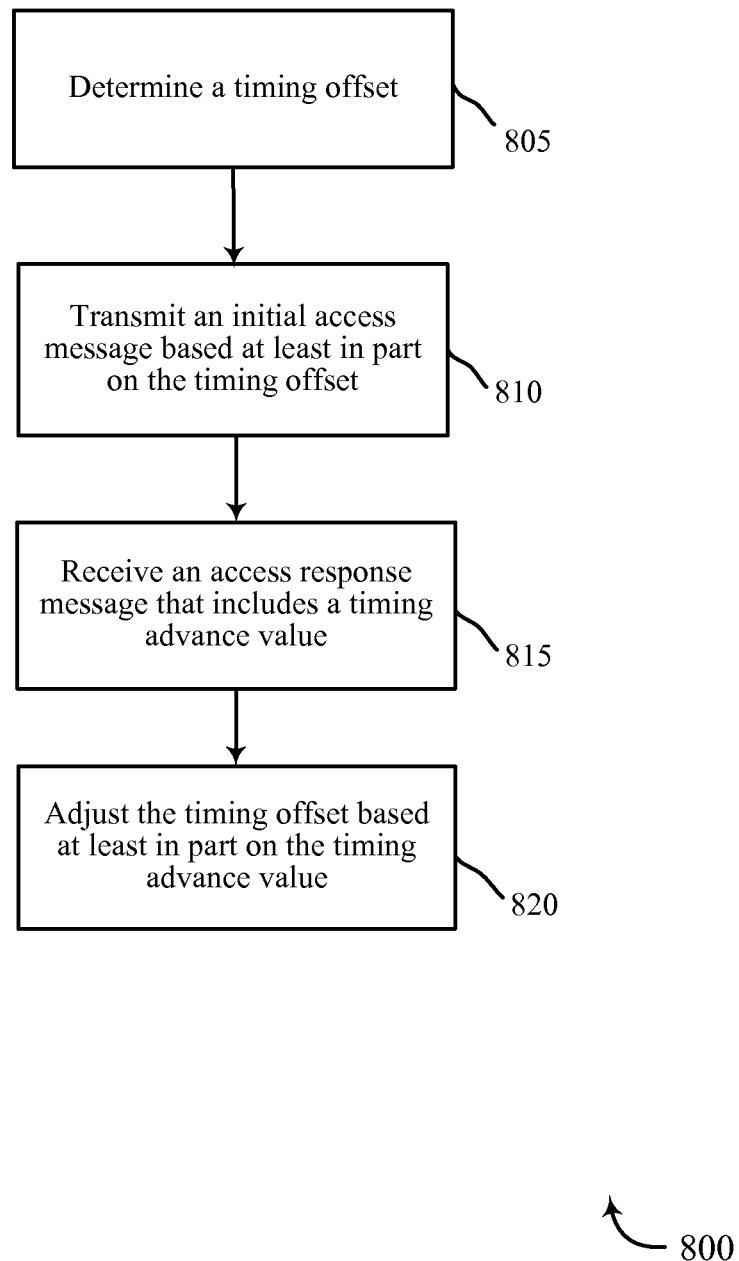

Turning next to FIG. 8, a flowchart shows a method 800 for establishing a wireless communications link at an AT. For clarity, the method 800 is described below with reference to one of the ATs 115 described with reference to FIGS. 1, 2, 3, 4, 5, and/or 6. At block 805, the offset module 425 may determine a timing offset. The timing offset may be based at least in part on a propagation delay between an AT 115 and a ground station 105. Thus, the offset module 425 may be means for determining a timing offset based at least in part on a propagation delay between the AT 115 and a ground station 105.

At block 810, the initial access module 405, in coordination with the transmitter 215, may transmit an initial access message based at least in part on a determined timing offset in coordination with the offset module 425. The initial access message transmission may convey an RA-RNTI. Thus, the initial access module 405 may be means for transmitting an initial access message to the ground station 105 based at least in part on the determined timing offset. The transmitter 215 may also be means for transmitting the initial access message to be received at the ground station by a subset of ground station antenna elements comprising one or more widely-spaced elements configured to achieve wide coverage and antenna diversity.

At block 815, the response message module 410 may, in coordination with the receiver 205, receive an access response message that includes a timing alignment value. The response message module 410 may pass this timing alignment value on to the offset adjustment module 430. The access response message may comprise at least a RNTI (e.g., either a cell-RNTI or a temporary cell-RNTI) and an uplink grant resource. Thus, the response message module 410 may be the means for receiving an access response message from the ground station that includes a timing alignment value.

At block 820, the offset adjustment module 430 may adjust the timing offset based at least in part on the timing advance value. This may be done in coordination with the offset module 425. Thus, the offset adjustment module 430 may be means for adjusting the timing offset based at least in part on the timing alignment value.

Figure 9:
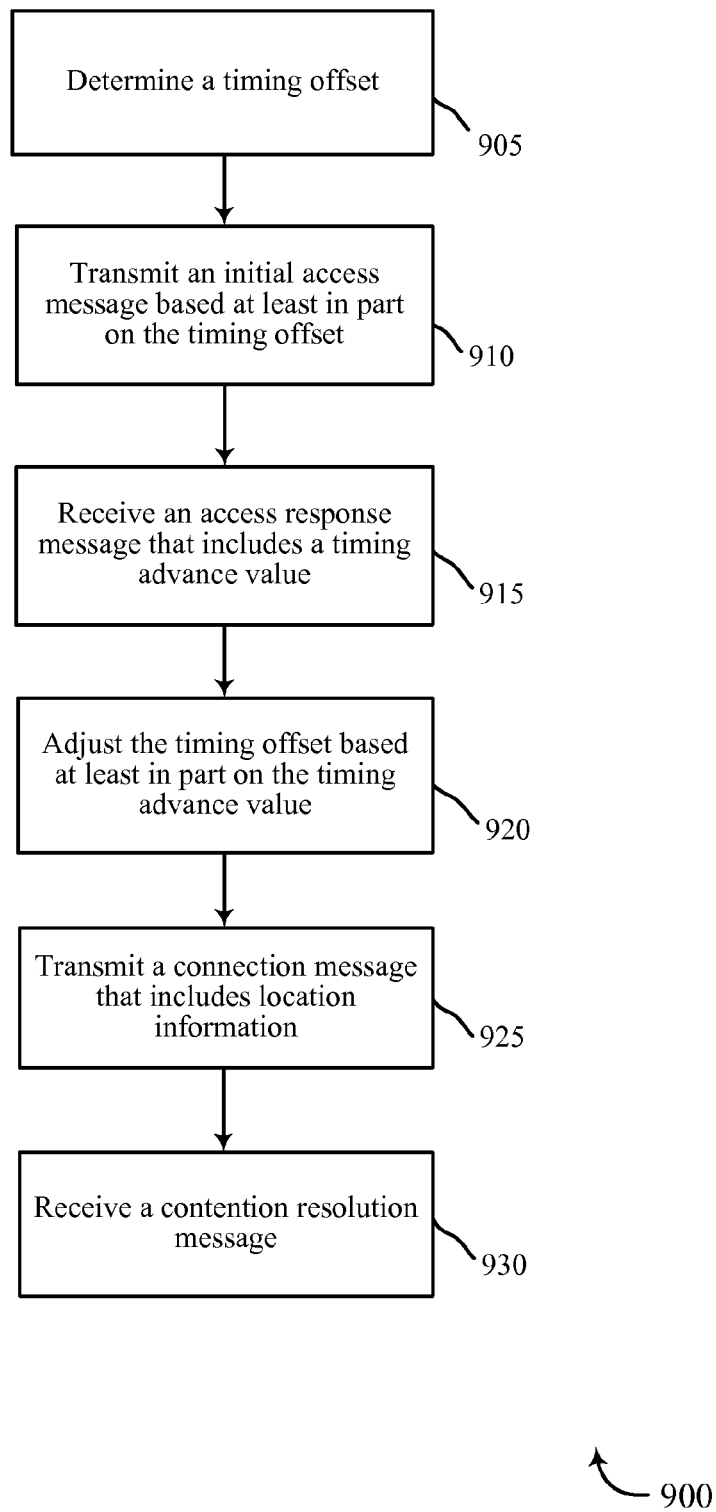
FIG. 9 is a flowchart of a method for establishing a wireless communications link at an AT depicting additional steps.

Turning next to FIG. 9, a flowchart shows a method 900 for transmitting location information with an RRC connection request message or an RRC re-establishment request message. For clarity, the method 900 is described below with reference to one of the ATs 115 described with reference to FIGS. 1, 2, 3, 4, 5, and/or 6. At block 905, the offset module 425 may determine a timing offset. The offset module 425 may determine the timing offset based on location information from the location module 315. The AT location module 435 may be the means for identifying an AT location, and in one embodiment, means for identifying the AT location from a GPS device. The GS location module may be means for accessing the ground station location from a stored set of ground station locations. Thus, the location module 315 may be means for comparing the AT location to a ground station location.

At block 910, the initial access module 405 may, in coordination with the transmitter 215, transmit an initial access message based at least in part on the determined timing offset in coordination with the offset module 425.

At block 915, the response message module 410 may, in coordination with the receiver 205, receive an access response message that includes a timing alignment value. The response message module 410 may pass this timing alignment value on to the offset adjustment module 430. The access response message may comprise at least a RNTI (e.g., either a cell-RNTI or a temporary cell-RNTI) and an uplink grant resource. Thus, the response message module 410 may be the means for receiving an access response message from the ground station that includes a timing alignment value.

At block 920, the offset adjustment module 430 may adjust the timing offset based at least in part on the timing advance value. This may be done in coordination with the offset module 425. Thus, the offset adjustment module 430 may be means for adjusting the timing offset based at least in part on the timing alignment value.

At block 925, the connection message module 415 may, in coordination with the transmitter 215, transmit a connection message to a ground station 105 that includes AT location information. The connection message may be transmitted based at least in part on an adjusted timing offset in coordination with the offset adjustment module 430. The location information may be received from the AT location module 435. In some cases the connection message may be an RRC connection request message or an RRC re-establishment request message, and may include one or more of a random value, a TMSI, or a connection establishment cause. Thus, the connection message module 415 may be means for transmitting a connection message that includes AT location information.

At block 930, the contention resolution module 420 may, in coordination with the receiver 205, receive a contention resolution message. A contention resolution message may be addressed to an AT 115 with a specific TMSI or random number. It may include a C-RNTI to be used for further communications. Thus, the contention resolution module 420 may means for receiving a contention resolution message.

Figure 10:
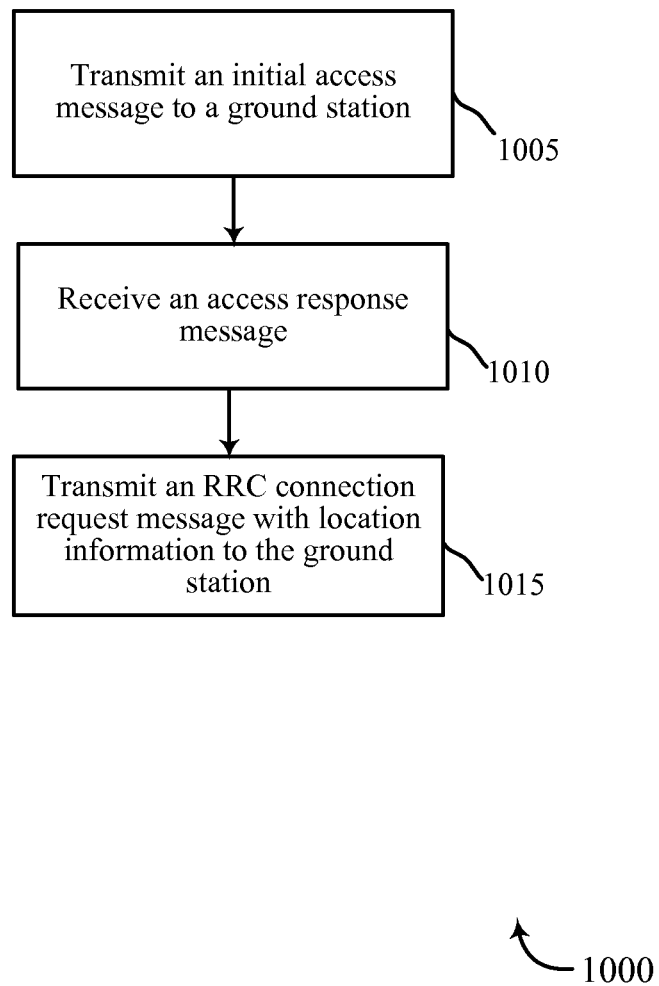
FIG. 10 is a flowchart of a method for transmitting location information with an radio resource control (RRC) connection request message.

Turning next to FIG. 10, a flowchart shows a method 1000 for transmitting location information with an RRC connection request message. For clarity, the method 1000 is described below with reference to one of the ATs 115 described with reference to FIGS. 1, 2, 3, 4, 5, and/or 6. At block 1005, the initial access module 405 may, in coordination with the transmitter 215, transmit an initial access message to a ground station. In one embodiment, the transmission is based on a timing offset, but in another embodiment there is no initial timing offset. Thus, the initial access module 405 may be means for transmitting an initial access message to the ground station 105.

At block 1010, the response message module 410 may, in coordination with the receiver 205, receive an access response message from the ground station 105. At block 1015, the connection message module 415 may, in coordination with the transmitter 215, transmit an RRC connection request message with AT location information to the ground station 105. The information location may be received from the AT location module 435. Thus, the connection message module 415 may be means for transmitting an RRC connection request message to the ground station, the RRC connection request message comprising location information of the AT.

Figure 11:
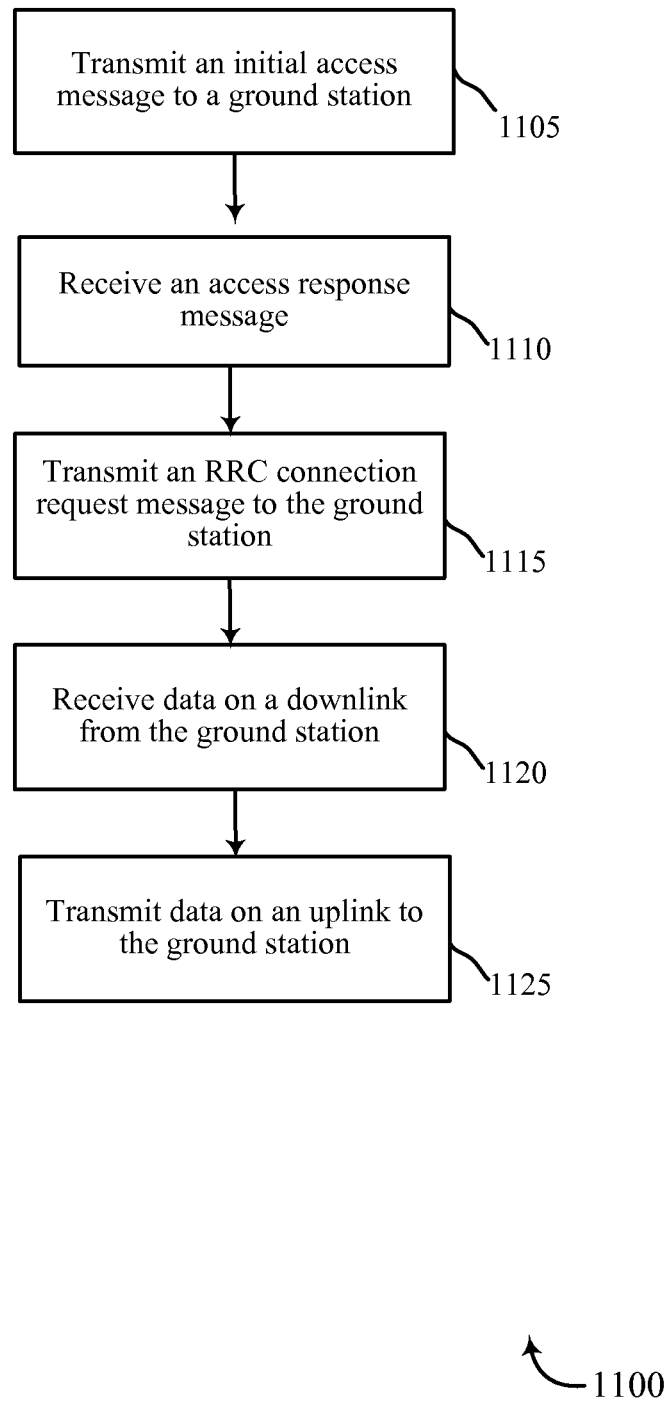
FIG. 11 is a flowchart of a method for transmitting location information with an RRC connection request message depicting additional steps.

Turning next to FIG. 11, a flowchart shows a method 1100 for establishing a wireless communications link at an AT. For clarity, the method 1100 is described below with reference to one of the ATs 115 described with reference to FIGS. 1, 2, 3, 4, 5, and/or 6. At block 1105, the initial access module 405 may, in coordination with the transmitter 215, transmit an initial access message to a ground station. At block 1110, the response message module 410 may, in coordination with the receiver 205, receive an access response message from the ground station 105. At block 1115, the connection message module 415 may, in coordination with the transmitter 215, transmit an RRC connection request message with location information to the ground station 105.

At block 1120, the receiver 205 may receive data on a downlink from the ground station 105. The data may be received in coordination with the modem 520 and the network interface module 525. Thus, the receiver 205 may be means for receiving data on a downlink from the ground station 105, the data being transmitted on the downlink via a beamforming configuration at the ground station 105.

At block 1125, the transmitter 215 may transmit data on an uplink to the ground station 105. The data may be transmitted in coordination with the modem 520 and the network interface module 525. Thus, the transmitter 215 may be means for transmitting data on an uplink to the ground station 105, the data being received on the uplink via a beamforming configuration at the ground station 105.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of establishing a wireless communications link at an aircraft terminal (AT), comprising:
   determining a timing offset based at least in part on a propagation delay between the AT and a ground station;
   initiating communication to establish a radio resource control (RRC) interface with the ground station prior to receiving a message from the ground station by transmitting an initial access message to the ground station based at least in part on the determined timing offset, the initial access message being a first indication to the ground station of the AT requesting the RRC interface;
   receiving an access response message from the ground station that includes a timing alignment value; and
   adjusting the timing offset based at least in part on the timing alignment value.

2. The method of claim 1, wherein a distance between the AT and the ground station is at least 100 kilometers.

3. The method of claim 1, wherein the determining the timing offset further comprises:
   identifying an AT location; and
   comparing the AT location to a ground station location.

4. The method of claim 3, further comprising:
   identifying the AT location using a Global Positioning System (GPS) device; and
   accessing the ground station location from a stored set of ground station locations.

5. The method of claim 1, wherein the access response message comprises a radio network temporary identifier (RNTI) and an uplink grant resource; wherein the uplink grant resource reserves resources for an uplink transmission of a connection message with an AT location information; and the RNTI comprises either a cell-RNTI (C-RNTI) or a temporary cell RNTI (TEMP-CRNTI).

6. The method of claim 1, further comprising:
   transmitting a connection message that includes location information.

7. The method of claim 6, wherein the location information comprises at least a longitude value, a latitude value, and an altitude value indicating a location of the AT.

8. The method of claim 6, wherein the transmitting the connection message is based at least in part on the adjusted timing offset.

9. The method of claim 1, further comprising:
   transmitting the initial access message to be received at the ground station by one or more ground station antenna elements comprising one or more widely-spaced elements configured to achieve wide coverage and antenna diversity.

10. The method of claim 1, further comprising:
    transmitting an RRC connection request message to the ground station based at least in part on the adjusted timing offset, the RRC connection request message comprising location information of the AT.

11. The method of claim 10, wherein the location information comprises one or more of a latitude, a longitude, an altitude, a heading, a velocity, or a time stamp.

12. The method of claim 10, wherein the location information is configured to facilitate beamforming at the ground station.

13. The method of claim 1, further comprising:
    receiving data on a downlink from the ground station, the data being transmitted on the downlink via a beamforming configuration at the ground station.

14. The method of claim 1, further comprising:
transmitting data on an uplink to the ground station, the data being received on the uplink via a beamforming configuration at the ground station.

15. The method of claim 1, wherein the initial access message comprises a random access preamble.

16. An apparatus for establishing a wireless communications link at an aircraft terminal (AT), comprising:
means for determining a timing offset based at least in part on a propagation delay between the AT and a ground station;
means for transmitting an initial access message to the ground station based at least in part on the determined timing offset to establish a radio resource control (RRC) interface with the ground station prior to receiving a message from the ground station, the initial access message being a first indication to the ground station of the AT requesting the RRC interface;
means for receiving an access response message from the ground station that includes a timing alignment value; and
means for adjusting the timing offset based at least in part on the timing alignment value.

17. The apparatus of claim 16, wherein a distance between the AT and the ground station is at least 100 kilometers.

18. The apparatus of claim 16, wherein the means for determining the timing offset further comprises:
means for identifying an AT location; and
means for comparing the AT location to a ground station location.

19. The apparatus of claim 18, wherein:
the means for identifying the AT location comprises means for identifying the AT location using a GPS device; and
the means for comparing comprises means for accessing the ground station location from a stored set of ground station locations.

20. The apparatus of claim 16, wherein the access response message comprises a radio network temporary identifier (RNTI) and an uplink grant resource; wherein the uplink grant resource reserves resources for an uplink transmission of a connection message with an AT location information; and the RNTI comprises either a cell-RNTI (C-RNTI) or a temporary cell RNTI (TEMP-CRNTI).

21. The apparatus of claim 16, further comprising:
means for transmitting a connection message that includes location information.

22. The apparatus of claim 21, wherein the location information comprises at least a longitude value, a latitude value, and an altitude value indicating a location of the AT.

23. The apparatus of claim 21, wherein the means for transmitting the connection message is based at least in part on the adjusted timing offset.

24. The apparatus of claim 16, further comprising:
means for transmitting the initial access message to be received at the ground station by one or more ground station antenna elements comprising one or more widely-spaced elements configured to achieve wide coverage and antenna diversity.

25. An apparatus for establishing a wireless communications link at an aircraft terminal (AT), comprising:
a processor;
memory in electronic communication with the processor; and
instructions stored in the memory, the instructions being executable by the processor to:
determine a timing offset based at least in part on a propagation delay between the AT and a ground station;
initiate communication to establish a radio resource control (RRC) interface with the ground station prior to receiving a message from the ground station through transmission of an initial access message to the ground station based at least in part on the determined timing offset, the initial access message being a first indication to the ground station of the AT requesting the RRC interface;
receive an access response message from the ground station that includes a timing alignment value; and
adjust the timing offset based at least in part on the timing alignment value.

26. The apparatus of claim 25, wherein a distance between the AT and the ground station is at least 100 kilometers.

27. The apparatus of claim 25, the instructions being further executable by the processor to:
identify an AT location; and
compare the AT location to a ground station location.

28. The apparatus of claim 27, the instructions being further executable by the processor to:
identify the AT location using a GPS device; and
access the ground station location from a stored set of ground station locations.

29. The apparatus of claim 25, the instructions being further executable by the processor to:
transmit a connection message that includes location information.

30. The apparatus of claim 29, wherein transmission of the connection message is based at least in part on the adjusted timing offset.

31. The apparatus of claim 25, the instructions being further executable by the processor to:
transmit the initial access message to be received at the ground station by one or more ground station antenna elements comprising one or more widely-spaced elements configured to achieve wide coverage and antenna diversity.

* * * * *